(12) United States Patent
Cornish

(10) Patent No.: US 8,299,636 B2
(45) Date of Patent: Oct. 30, 2012

(54) MAGNETIZED FOUCAULT PENDULUM ELECTRICAL ENERGY SOURCE

(76) Inventor: Douglas H. Cornish, Silver Spring, MD (US)

( * ) Notice: Subject to any disclaimer, the term of this patent is extended or adjusted under 35 U.S.C. 154(b) by 372 days.

(21) Appl. No.: 12/662,055

(22) Filed: Mar. 30, 2010

(65) Prior Publication Data

US 2011/0133484 A1    Jun. 9, 2011

Related U.S. Application Data

(60) Provisional application No. 61/282,140, filed on Dec. 22, 2009.

(51) Int. Cl.
*F03B 63/04* (2006.01)
(52) U.S. Cl. .......................................................... 290/1 R
(58) Field of Classification Search ................... 290/1 R; 74/DIG. 9; 415/916; 33/398, 391, 392
See application file for complete search history.

(56) References Cited

U.S. PATENT DOCUMENTS

| | | | | |
|---|---|---|---|---|
| 4,011,674 A * | 3/1977 | Jacobson | ...................... | 40/426 |
| 4,748,338 A * | 5/1988 | Boyce | ............................. | 290/42 |
| 6,781,270 B2 * | 8/2004 | Long | ........................... | 310/90.5 |
| 6,946,748 B2 * | 9/2005 | Love | ................................ | 290/1 C |
| 2004/0070208 A1 * | 4/2004 | Chiu | ............................ | 290/1 R |
| 2005/0248159 A1 * | 11/2005 | Seoane | ........................ | 290/1 R |
| 2008/0001579 A1 | 1/2008 | Claypool | ................. | 74/DIG. 9 |
| 2008/0174120 A1 * | 7/2008 | Gardner et al. | ................... | 290/1 |
| 2009/0085413 A1 | 4/2009 | Struck | ........................ | 74/DIG. 9 |
| 2010/0148517 A1 * | 6/2010 | Duclos | ............................. | 290/1 |
| 2010/0237631 A1 * | 9/2010 | Yu | ................................. | 290/1 R |

* cited by examiner

*Primary Examiner* — Julio Gonzalez
(74) *Attorney, Agent, or Firm* — Welsh Flaxman & Gitler LLC

(57) ABSTRACT

A magnetized Foucault Pendulum electrical energy source having a gear transmission connected between the rotatable Foucault Pendulum and an electrical generator. A portion of the current from the generator is transmitted to an electromagnet which is periodically energized to repel a mass on the end of the pendulum to maintain the pendulum in continuous motion. The remaining portion of the electrical current is transmitted to individual households or to a power grid.

5 Claims, 2 Drawing Sheets

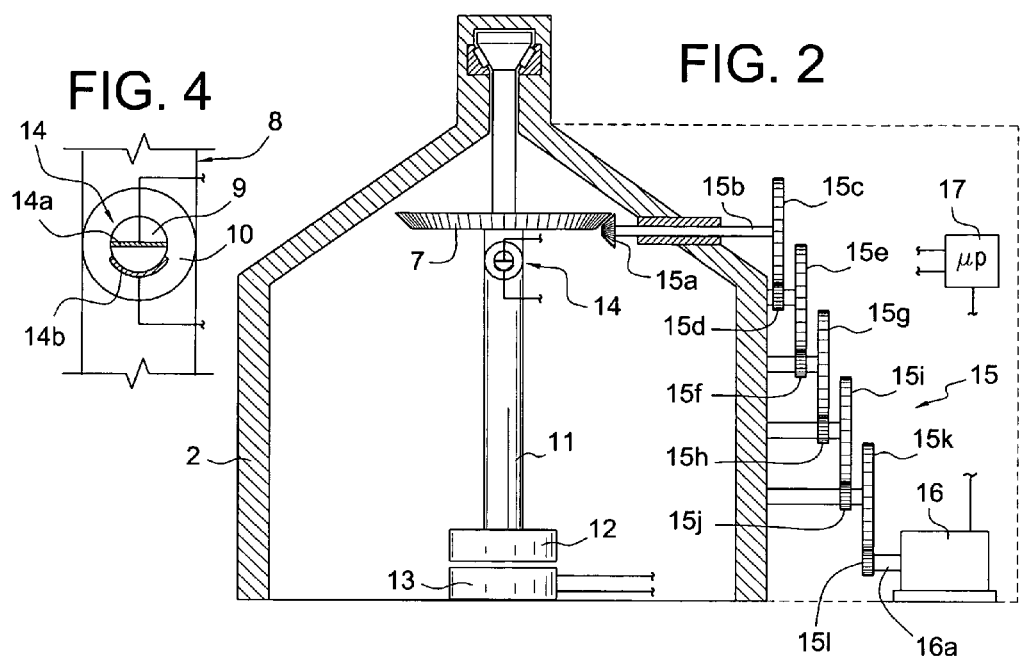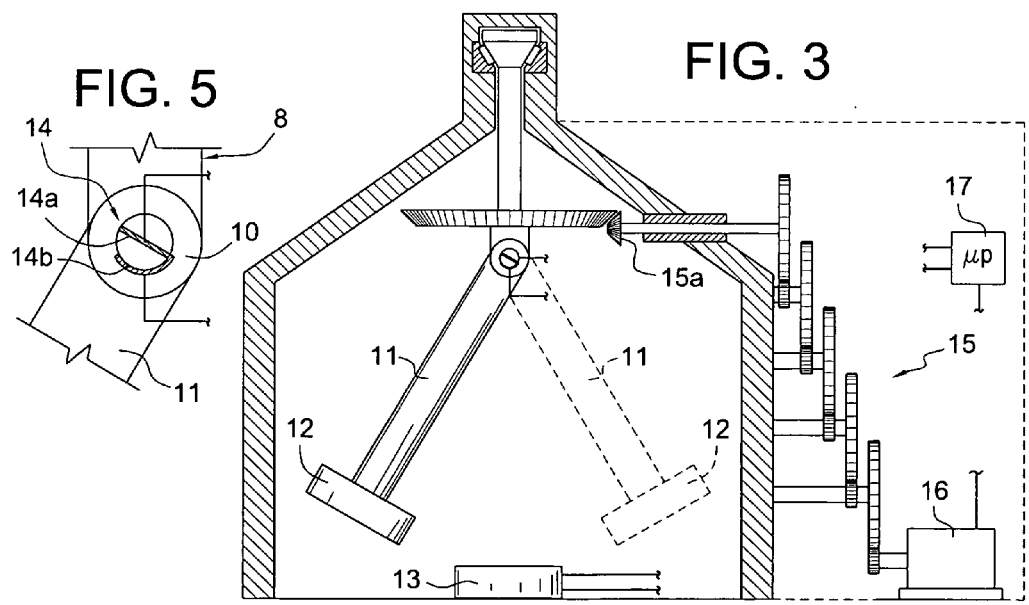

US 8,299,636 B2

MAGNETIZED FOUCAULT PENDULUM ELECTRICAL ENERGY SOURCE

This application relates to Provisional Patent Application Ser. No. 61/282,140 filed Dec. 22, 2009

BACKGROUND OF THE INVENTION

A Foucault pendulum rotates in relation to the earth's rotation. The rate of rotation of a Foucault pendulum at any given point is numerically equal to the component of the earth's rate of rotation perpendicular to the earth's surface at that point; thus, the earth's rotation makes the pendulum rotate while oscillating.

After considerable research and experimentation, the Foucault pendulum of the present invention has been devised to produce electrical energy.

SUMMARY OF THE INVENTION

The Foucault pendulum of the present invention is magnetized and has a gear transmission connected between the rotatable pendulum and an electrical generator. A portion of the current from the generator is transmitted to an electromagnet which is periodically energized to repel a mass on the end of the pendulum, whereby the pendulum is maintained in continuous motion. The remaining portion of the electrical current is transmitted to individual households or to a power grid.

BRIEF DESCRIPTION OF THE DRAWINGS

FIG. 2 is a sectional side elevational view of the pendulum of the present invention at rest;

FIG. 3 is a sectional side elevational view of the pendulum of the present invention in motion;

FIG. 4 is a fragmentary, side elevational view of a switch connected to the pendulum as shown in FIG. 2; and, FIG. 5 is a fragmentary, side elevational view of the switch in a position as shown in FIG. 3.

DESCRIPTION OF THE PREFERRED EMBODIMENT

Figure 1:
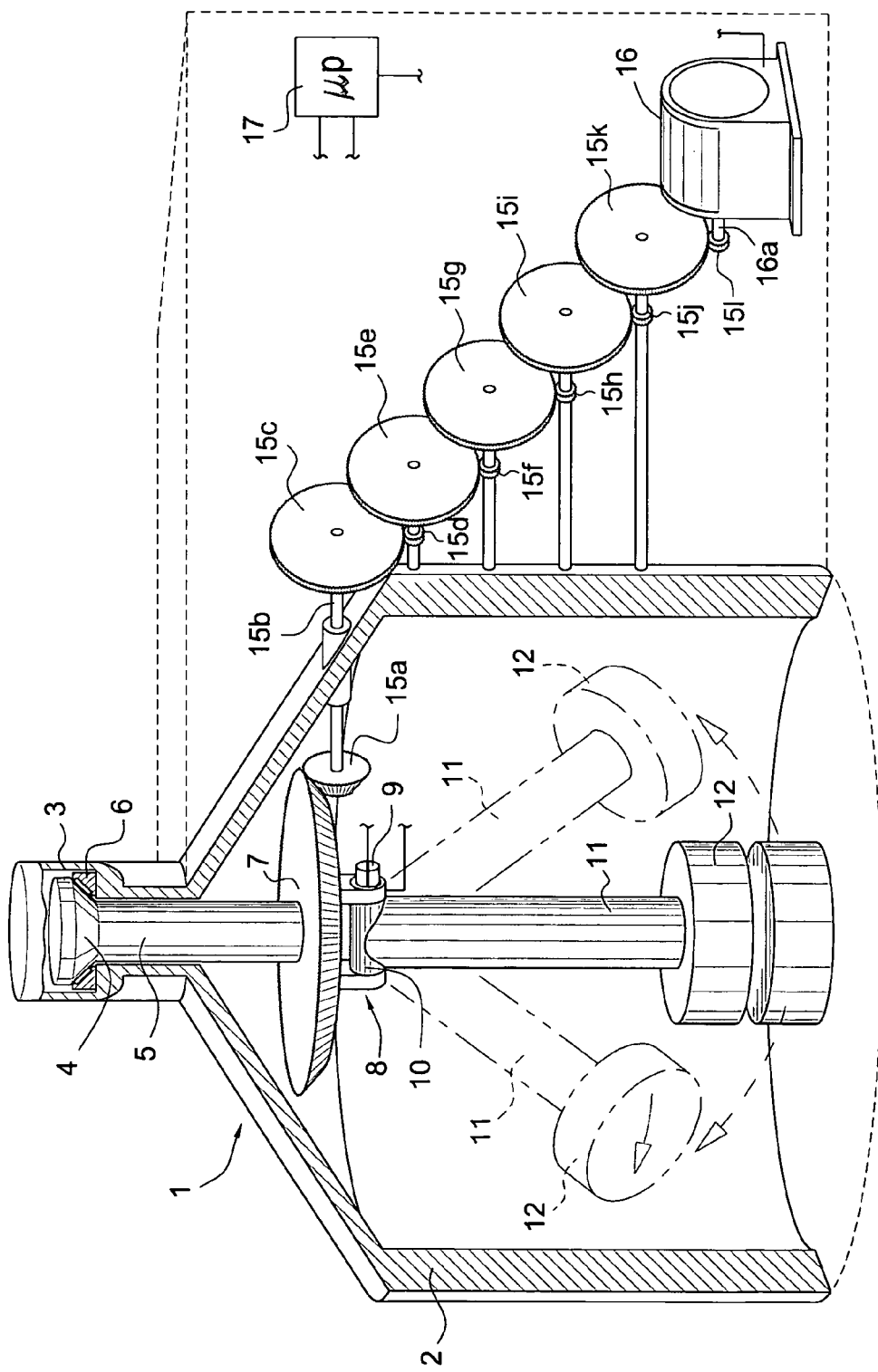
FIG. 1 is a sectional perspective view of the magnetized Foucault pendulum energy source of the present invention.

Referring to the drawings and more particularly to FIG. 1, the magnetized Foucault pendulum energy source 1 of the present invention comprises a housing 2 having a cupola 3 containing a conical upper end portion 4 of a vertically extending shaft 5. A tapered roller bearing 6 is mounted in the cupola 3 for rotatably supporting the conical upper end portion 4 of the shaft 5.

A tapered spur gear 7 is integrally connected to the lower end of the shaft 5 and has a depending clevis 8 integrally connected thereto. A pin 9 extends transversely of the clevis 8 and through a sleeve 10 integral with the upper end of a depending pendulum arm 11 having a metal weight 12 integral with the lower end of the arm 11. By this construction and arrangement, the pendulum is free to pivot about pin 9 relative to the gear 7, as shown in phantom in FIG. 1.

As noted herein above, a Foucault pendulum rotates as it oscillates; accordingly, since the clevis 8 is integral with the gear 7, as the pendulum arm 11 oscillates about pin 9, the gear 7 will be caused to rotate.

As will be seen in FIGS. 2 and 3, in order to maintain the oscillatory movement of the pendulum arm 11 and associated weight 12, electromagnet 13 is provided beneath the pendulum weight 12. The electromagnet 13 is connected to a source of electrical power to be described more fully hereinafter, in such a manner that when the pendulum arm 11 is in the positions shown in FIG. 3, the electromagnet is energized to draw the weight 12 and associated arm 11 in a direction toward the electromagnet 13. When the pendulum weight 12 approaches the electromagnet 13, the electromagnet 13 is de-energized allowing the inertia of the weight 12 to move the pivot arm to the opposite positions of the oscillating stroke.

In order to de-energize the electromagnet 13 at the proper time, a switch 14 is provided between the pin 9 and sleeve 10. As will be seen in FIGS. 4 and 5, the switch 14 comprises a conductor strip 14a extending diametrically through the pin 9 and an arcuate conductor strip 14b mounted on the interior wall of the sleeve 10. The switch 14 is connected to the electrical power source so that when the switch 14 is at the position shown in FIGS. 2 and 4, the switch is in the open position and the electromagnet 13 is de-energized. When the switch 14 is in the position shown in FIG. 5, the switch 14 is in the closed position, whereby the electromagnet 13 is energized.

In order to utilize the rotational movement of the Foucault pendulum, a suitable gear transmission 15 is provided between the gear 7 and an electrical generator 16. The gear transmission comprises a first gear 15a meshing with the gear 7. The gear 15a is mounted on one end of a horizontal shaft 15b journalled within and extending through the roof of the housing 2. A second large diameter gear 15c meshes with a small diameter gear 15d having a large diameter gear 15e. The large diameter gear 15e meshes with a small diameter gear 15f having a large diameter gear 15g mounted thereon which meshes with a small diameter gear 15h. A large diameter gear 15i is integral with the gear 15h and meshes with a small diameter gear 15j integral with large diameter gear 15k, which in turn meshes with a small diameter pinion gear 15l connected to the end of the input shaft 16a of the generator 16. The dimensions and ratios of the various gears in the gear train 15 are such that the rotation of the Foucault pendulum 1 will cause the generator 16 to rotate at 1500 RPM to thereby produce 250 Kilowatts of electrical energy to not only energize the electromagnet 13 but also to supply electrical energy to other users.

A microprocessor 17 is also provided for controlling the electrical energy supplied by the generator 16 to the electromagnet 13 and to individual households or a power grid.

It is to be understood that the form of the invention herewith shown and described is to be taken as a preferred example of the same, and that various changes in the shape, size and arrangement of parts may be resorted to without departing from the spirit of the invention or scope of the subjoined claims.

I claim:

1. A magnetized Foucault pendulum electrical energy source comprising an oscillating and rotating Foucault pendulum, means for mounting the Foucault pendulum, said means for mounting the Foucault pendulum comprising a housing, a cupola mounted on the top of said housing, a vertical shaft extending into said cupola, said vertical shaft having a conical upper end portion and lower end, a tapered roller bearing mounted in the cupola for rotatably supporting the conical upper end portion of said vertical shaft, a clevis, a depending pendulum arm pivotally connected to said clevis, and a metal weight integral with the lower end of said pendulum arm, a gear integrally connected between said vertical shaft and said clevis, a gear train connected between said gear and an electrical generator, whereby rotation of said Foucault pendulum drives said gear train and said electrical generator to thereby produce electrical energy.

2. A magnetized Foucault pendulum, according to claim 1, wherein the depending pendulum arm is pivotally connected to said clevis by a pin extending transversely through said clevis, and a sleeve integral with the upper end portion of said pendulum arm.

3. A magnetized Foucault pendulum, according to claim 2 wherein an electromagnet is mounted in said housing beneath the metal weight mounted on the lower end of said pendulum arm, said electromagnet being connected to said electrical generator, and switch means connected between said pendulum arm and said generator, whereby when the pendulum arm is in the opposite positions of the oscillating stroke, the electromagnet is energized to draw the metal weight and associated arm toward the electromagnet, whereupon the electromagnet is de-energized allowing the inertia of the metal weight to move the pendulum arm to the opposite positions of the oscillating stroke.

4. A magnetized Foucault pendulum, according to claim 3, wherein the switch means comprises a conductor strip extending diametrically through said pin, and an arcuate conductor strip mounted on the interior wall of said sleeve, whereby when the pendulum arm and said metal weight are positioned above the electromagnet, the switch is in the open position and the electromagnet is de-energized; and when the pendulum arm and said metal weight are at the opposite positions of the oscillating stroke, the switch is in the closed position and the electromagnet is energized to draw the pendulum arm and said metal weight toward the electromagnet.

5. A magnetized Foucault pendulum, according to claim 4, wherein a micro-processor is electrically connected to the electrical generator for controlling the electrical energy supplied by the generator to the electromagnet and to individual households or a power grid.

* * * * *